(12) United States Patent
Oka et al.

(10) Patent No.: US 6,905,646 B1
(45) Date of Patent: Jun. 14, 2005

(54) METHODS OF PRODUCING SYNTHETIC RESIN WIRE

(75) Inventors: Ryoei Oka, Osaka (JP); Nobumasa Nirasawa, Osaka (JP); Saburo Yoshimura, Osaka (JP); Hironori Matsumoto, Osaka (JP)

(73) Assignee: Sumitomo Electric Industries, Ltd, Osaka (JP)

( * ) Notice: Subject to any disclaimer, the term of this patent is extended or adjusted under 35 U.S.C. 154(b) by 0 days.

(21) Appl. No.: 09/937,145

(22) PCT Filed: Mar. 23, 2000

(86) PCT No.: PCT/JP00/01786

§ 371 (c)(1),
(2), (4) Date: Sep. 21, 2001

(87) PCT Pub. No.: WO00/56519

PCT Pub. Date: Sep. 28, 2000

(30) Foreign Application Priority Data

Mar. 23, 1999 (JP) .................................. P1999-077747

(51) Int. Cl.⁷ .............................................. B29C 47/88
(52) U.S. Cl. ........................ 264/177.19; 264/178 R; 264/211.13; 264/211.18; 264/234
(58) Field of Search .................... 264/177.1, 177.19, 264/178 R, 211.12, 211.13, 211.18, 234, 177 R; 425/68, 70, 71; 385/100, 147

(56) References Cited

U.S. PATENT DOCUMENTS

| | | | | |
|---|---|---|---|---|
| 3,886,250 A | * | 5/1975 | Danko | .................... 264/177.19 |
| 4,115,495 A | * | 9/1978 | Hartitz | ........................ 264/567 |
| 4,691,758 A | * | 9/1987 | Palmer | ........................ 164/461 |
| 4,781,434 A | | 11/1988 | Kitagawa et al. | |
| 5,108,277 A | * | 4/1992 | Dixon | ........................ 425/72.1 |
| 5,380,472 A | * | 1/1995 | Schneider | .................. 264/1.29 |
| 5,484,557 A | * | 1/1996 | Groeblacher | ............. 264/37.11 |
| 5,514,307 A | * | 5/1996 | Shirley et al. | ................. 264/14 |
| 5,665,278 A | * | 9/1997 | Allen et al. | ..................... 264/6 |
| 6,485,282 B2 | * | 11/2002 | Wegmaier et al. | ............ 425/71 |
| 6,645,410 B2 | * | 11/2003 | Thompson | ............. 264/171.13 |

FOREIGN PATENT DOCUMENTS

| | | |
|---|---|---|
| CH | 611 549 | 6/1979 |
| DE | 86 06 212 | 7/1987 |
| JP | 61-227016 | 10/1986 |
| JP | 61293828 | 12/1986 |
| JP | 63-180921 | 7/1988 |
| JP | 01150519 | 6/1989 |
| JP | 01-150519 | 6/1989 |
| JP | 01243317 | 9/1989 |
| JP | 01-243317 | 9/1989 |
| JP | 01-166520 | 11/1989 |
| JP | 05-278096 | 10/1993 |
| JP | 07-001556 | 1/1995 |
| JP | 07-329152 | 12/1995 |
| JP | 10109352 | 4/1998 |
| JP | 10309747 | 11/1998 |
| JP | 10-309747 | 11/1998 |

OTHER PUBLICATIONS www.dictionary.com/spray (source—Webster's Revised Unabridged Dictionary, 1996).*
Yukio Ito, "Plastic Technologies Zensho 5: Polyethylene Resin (High Pressure Method)," Kogyo Chosakai Publishing Co., Ltd., Apr. 20, 1971, p. 7.

* cited by examiner

Primary Examiner—Mark Eashoo
(74) Attorney, Agent, or Firm—McDermott Will & Emery LLP

(57) ABSTRACT

A method of producing a synthetic resin rod (wire), comprising:
  an extruding step of extruding a synthetic resin rod;
  a pre-cooling step of spraying a cooling medium on the rod to pre-cool the rod extruded down to a temperature (T° C.) satisfying the following condition:

$T \leq \{(\text{a softening point of the synthetic resin})+5\}$ [° C.]; and a main cooling step of letting the rod thus pre-cooled pass through water to cool the rod.

6 Claims, 9 Drawing Sheets

METHODS OF PRODUCING SYNTHETIC RESIN WIRE

TECHNICAL FIELD

The present invention relates to methods of producing a synthetic resin rod (wire) and, more particularly, to methods particularly effective in production of a synthetic resin rod having grooves on the exterior surface thereof.

BACKGROUND ART

There are helical spacers (also called "slot rods (cores)" or "grooved rods (spacers)") each carrying a plurality of optical fibers to form a cable, similar to various profiles of thermoplastic resin extruded products. The spacers of this type are constructed normally in structure wherein a tension-resistive wire such as a steel wire is located in the central part and a plurality of helical grooves extending in the longitudinal direction are formed of the thermoplastic resin and around the periphery of the tension-resistive wire. The thermoplastic resin is selected mainly from crystalline synthetic resins such as high density polyethylene and the like in terms of the physical properties of mechanical strength, weatherability, etc. and the raw material cost.

Since the helical grooves carry the optical fibers inside, the shape of the helical grooves is an extremely important point in terms of prevention of loss increase due to microbend of the optical fibers, and how accurately the shape was made was a big concern among those skilled in the art. On the other hand, since the helical grooves of the spacer are made by melting and extruding the thermoplastic resin and then cooling and solidifying the extruded resin, a cooling method is one of significant matters that affect the accuracy of the groove shape.

Conventionally employed as a cooling method of the extruded rod in the production steps of the helical spacer as described was a method using an elongated water tank provided at the two ends with spongy packings having such a clearance as not to contact the rod, in which the rod immediately after extrusion was made to pass through the water tank with cooling water overflowing from the two ends. This method, however, had the problem that there occurred incompletion of the shape or roughness of the surface, particularly, when the shape of the helical grooves formed in the outer surface of the rod was complex.

Japanese Patent Application Laid-Open No. S61-227016 describes a method in which air is introduced from one end of a pipe while aspirating the air from the other end so as to make an air stream and in which the spacer is made to pass through to be cooled and solidified. However, this method had the problem that it was difficult for this method to achieve the satisfactory cooling effect and the cooling interval became long.

Further, Japanese Patent Application Laid-Open No. H05-278096 describes a method in which air kept at a fixed temperature is introduced from one end of a constant temperature chamber to maintain the interior of the chamber at a predetermined temperature and in which a blast of constant temperature air is also delivered against the spacer passing inside the chamber to cool and solidify the spacer. This method, however, also had the problem that it was also difficult for this method to achieve the satisfactory cooling effect, the cooling interval became long, and the cost of facilities for the cooling was high.

DISCLOSURE OF THE INVENTION

The present invention has been accomplished in view of the problems of the prior arts described above and an object of the invention is to provide a method capable of producing a rod (wire), even a synthetic resin rod having grooves on the exterior surface such as the helical spacers, with high accuracy and with excellent surface nature under high cooling efficiency.

The inventors conducted extensive and intensive research to accomplish the above object and eventually found that the above problems were caused in the above conventional methods for the following reason. Namely, the inventors gained the knowledge as to the conventional method of passing the rod immediately after extrusion through the water tank provided at the two ends with packings that water also leaked out of the entrance side of the rod because of insufficient sealing of the packing and the first contact position of the rod with the cooling water varied to cause a speed difference of cooling of the rod, which led to occurrence of the incompletion of shape and the roughness of surface. Then the inventors discovered that it became feasible to produce the rod with high accuracy and excellent surface nature under high cooling efficiency, by pre-cooling the synthetic resin rod melted and extruded, down to a predetermined temperature by a blast of a cooling medium against it and thereafter letting the rod pass through water to cool and solidify it, or by letting the rod pass through the water tank in a condition in which the leakage of water from the rod entrance (wire entrance) is prevented, and completed the present invention, based thereon.

A production method of a synthetic resin rod (wire) according to the present invention is a method comprising:

an extruding step of extruding a synthetic resin rod;

a pre-cooling step of spraying a cooling medium on the rod to pre-cool the rod thus extruded down to a temperature (T° C.) satisfying the following condition:

$T \leq \{$(a softening point of the synthetic resin)$+5\}$ [° C.]; and a main cooling step of letting the pre-cooled rod pass through water to cool the rod.

According to this production method, since in the pre-cooling step before introduction of the synthetic resin rod into water the rod is cooled down to the predetermined temperature by the cooling medium while maintaining the as-extruded shape, the viscosity of the resin increases in the surface and the resin goes into a further solidified state. This prevent the synthetic resin rod from suffering the surface roughness, even with water droplets falling onto the synthetic resin rod near the rod entrance of the water tank, and from suffering the shape change, even with variation in the first contact position of the rod with cooling water, whereby the rod is cooled on a stable basis.

In the production method of the present invention the pre-cooling step is preferably a step of cooling the rod extruded to a temperature (T° C.) satisfying the following condition:

$\{$(the softening point of the synthetic resin)$-35\} \leq T \leq \{$(the softening point of the synthetic resin)$\}$ [° C.].

Cooling down to a lower temperature than the minimum temperature will lengthen the interval of the pre-cooling step, which is not preferable for practical use.

In the production method of the present invention, the cooling medium is preferably air, and in the pre-cooling step it is preferable to send the air to the periphery of the rod and more preferable to send the air to the rod evenly and along a moving direction thereof. By first spraying air to the periphery of the rod, it is feasible to reduce deformation of the rod shape (wire shape) and to implement effective air cooling.

In the production method of the present invention, the cooling medium is preferably misty water droplets, and in the pre-cooling step it is preferable to spray the misty water droplets on the periphery of the rod and more preferable to spray the misty water droplets on the rod evenly and along the moving direction thereof. The misty water droplets are preferably those having a mean particle size in the range of 20 to 80 $\mu$m. When the mean particle size of the misty water droplets is less than 20 $\mu$m, the cooling effect tends to become weaker. When it is over 80 $\mu$m on the other hand, the water droplets tend to readily cause the surface roughness of the synthetic resin rod. Therefore, the quick cooling effect is achieved in the above range.

Further, in the production method of the present invention, the cooling medium is preferably air and misty water droplets (preferably, those having a mean particle size in the range of 20 to 80 $\mu$m), and the pre-cooling step preferably comprises a first pre-cooling step of sending the air to the periphery of the rod and a second pre-cooling step of spraying the misty water droplets on the periphery of the rod.

The pre-cooling of the extruded synthetic resin rod to the predetermined temperature by the air and misty water droplets prior to the water cooling is preferable in terms of maintaining the dimensional accuracy, because no water pressure is exerted on the rod. Further, since the air cooling exerts a smaller external force on the rod than the mist cooling, it is preferable to first lower the temperature of the rod surface (wire surface) to the temperature below near the softening point by the air cooling and then cool the rod by the mist cooling.

Another production method of a synthetic resin rod (wire) according to the present invention is a method comprising:

an extruding step of extruding a synthetic resin rod; and a cooling step of letting the rod pass through a water tank to cool the rod while preventing leakage of water from a rod entrance (wire entrance), wherein the water tank comprises a water tank body, a first lid member provided with the rod entrance and attached to one end portion of the water tank body, and a second lid member provided with a rod exit (wire exit) and attached to another end portion of the water tank body, the water tank is filled with cooling water inside, and the rod entrance is equipped with a leak preventing device for preventing the leakage of water from the rod entrance.

According to this production method, the rod entrance of the water tank is equipped with the leak preventing device whereby the leakage of water from the rod entrance is suppressed. Accordingly, the first contact position of the rod with the cooling water can be kept approximately fixed, so that the rod is cooled evenly and stably without a speed difference of cooling.

The leak preventing device used in the production method of the present invention is preferably one comprising:

an outer cylinder having a diameter smaller than a diameter of the water tank body, having a water inlet in a cylindrical wall thereof, and arranged coaxially in the water tank body;

an inner cylinder having a length shorter than the outer cylinder and a diameter smaller than the diameter of the outer cylinder, and arranged coaxially in the outer cylinder; and a sealing member for sealing a portion outside the inner cylinder in the rod entrance, wherein, while the rod is inserted in the inner cylinder, water introduced from the inlet to the space between the outer cylinder and the inner cylinder is forced to flow in the moving direction of the rod, thereby preventing the leakage of water from the rod entrance.

In the above leak preventing device, when the synthetic resin rod passes the inner cylinder to enter the interior of the water tank, the leak preventing device forcibly generates a water stream in the moving direction of the rod. Further, when the synthetic resin rod having passed through the inner cylinder moves in the water tank, the viscosity of water generates a water stream in the moving direction of the rod. The running water thus generated in the moving direction of the rod acts to prevent the leakage of water which is apt to flow backward in the clearance between the inner cylinder and the synthetic resin rod. Then the leakage of water is prevented more securely by controlling the amount of water supplied from the inlet of the leak preventing device, so that the first contact position of the synthetic resin rod with the cooling water becomes fixed, whereby the rod is cooled evenly and stably without a speed difference of cooling of the synthetic resin rod.

BEST MODE FOR CARRYING OUT THE INVENTION

The preferred embodiments of the production methods of the synthetic resin rod (wire) according to the present invention will be described below in detail with reference to the accompanying drawings. Throughout the description of the drawings the same elements will be denoted by the same reference symbols and redundant description will be omitted.

(Embodiment 1)

Figure 1:
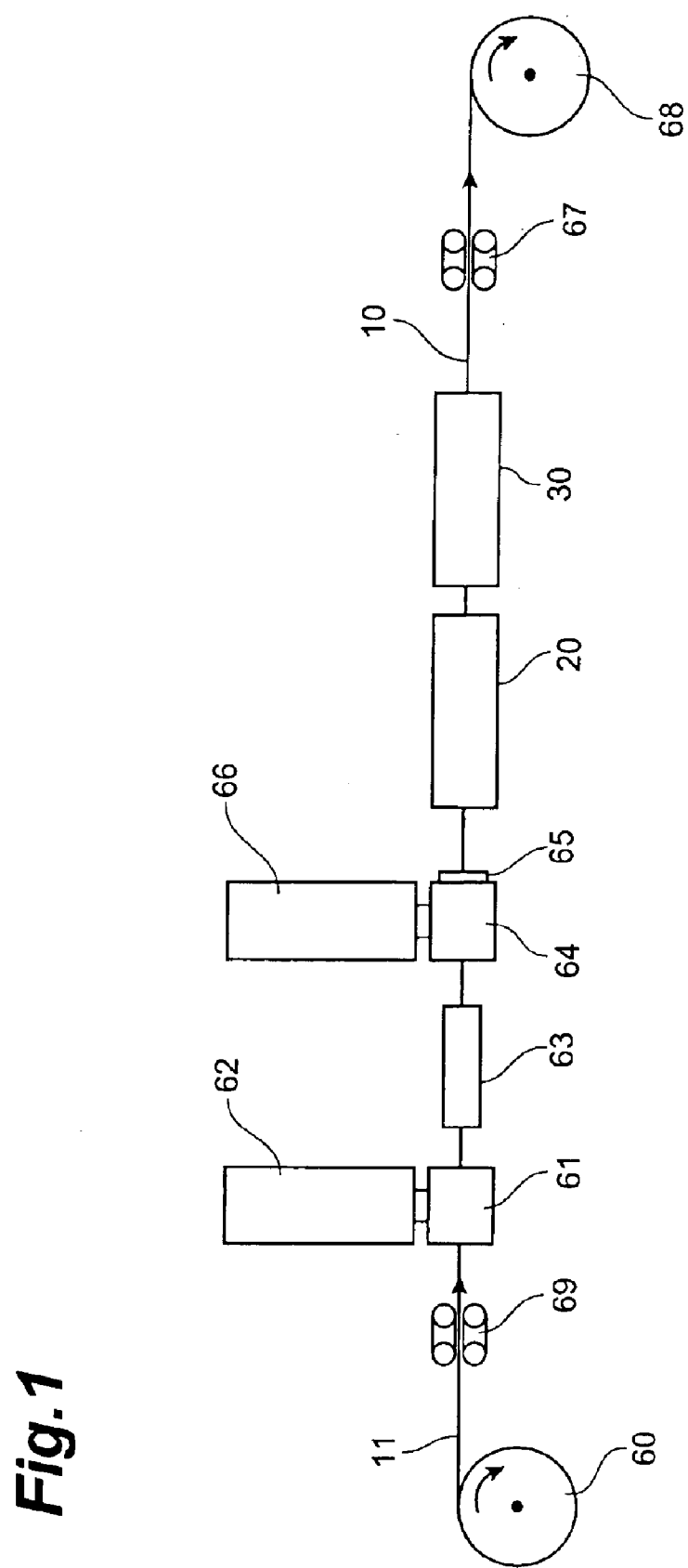
FIG. 1 is a schematic view showing an embodiment of a system suitably applicable to the production methods of the synthetic resin rod (wire) according to the present invention.
Figure 2:
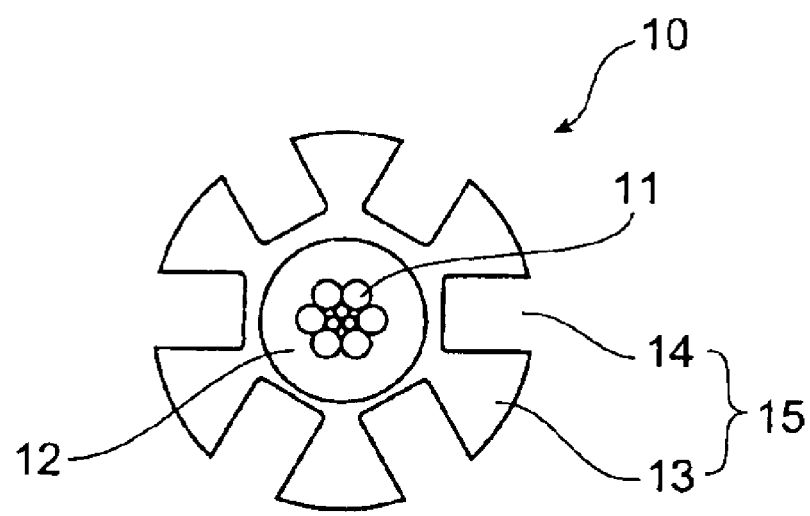
FIG. 2 is a cross-sectional view showing a synthetic resin rod having a spacer which has grooves on the outer surface.

FIG. 1 is a schematic overall diagram showing a system for production of the synthetic resin rod according to Embodiment 1. FIG. 2 is a cross-sectional view of a synthetic resin rod, and the synthetic resin rod 10 has such structure that a primary coating layer 12 of an adhesive resin A is provided around the periphery of tension-resistive wire 11 and that the periphery of the layer 12 is coated with a spacer 15 made of a synthetic resin B and having six grooves 14 in the longitudinal direction on its periphery. The grooves 14 can be either "helical grooves" formed by ribs 13 which are helical in one direction or "SZ grooves" formed by ribs 13 which change their turning directions at regular intervals.

In the production system shown in FIG. 1, the tension-resistive wire 11 fed out of a wire feeder 60 is guided via brake capstan 69, through a first crosshead 61 of first extruder 62, and through a first water tank 63 disposed in the extruding direction of the first crosshead 61 to form the primary coating layer 12 of a circular cross section around the tension-resistive wire 11, and subsequently, the spacer 15 having the grooves 14 is extruded onto the periphery of the tension-resistive wire 11 provided with the primary coating layer 12 during passage through a rotary die 65 attached to a second crosshead 64 of second extruder 66, thereby forming the synthetic resin rod 10 (extruding step).

Then the extruded rod 10 is guided through a pre-cooling means (second cooling means) 20 for spraying a cooling medium on the rod to cool it to not more than the temperature of the softening point of the synthetic resin +5° C. (pre-cooling step), and is guided through a main cooling means (first cooling means) 30 for letting the rod pass through water to cool it to ordinary temperature (main cooling step), so as to cool and solidify the spacer 15 (cooling step), and the synthetic resin rod 10 cooled and solidified is drawn by a drawing device 67 and thereafter is wound up by a take-up device 68. The cooling medium preferably used herein can be air and/or misty water droplets.

The tension-resistive wire 11 is constructed of a single wire or a stranded wire of steel or FRP.

The resin making the primary coating layer 12 is either of adhesive thermoplastic resins possessing adhesiveness to the tension-resistive wire 11, e.g., polyolefin based adhesive resins modified with epoxy, carboxylic acid, or the like, ethylene-ethylacrylate copolymers, polyamide copolymer resins, and so on. On the other hand, the resin making the spacer 15 is either of resins exhibiting large compatibility with the adhesive resin of the primary coating layer 12 and being fusible to adhere to the primary coating layer 12; for example, when the primary coating layer 12 is an adhesive resin containing polyethylene, the spacer 15 is preferably made of either of polyethylene based resins, such as high density polyethylene, and polyamide based resins. When the primary coating layer 12 is an adhesive resin containing polypropylene, the spacer 15 is preferably made of a homopolymer or a copolymer of polypropylene. Temperatures suitable for the extrusion of the resins making the primary coating layer 12 and the spacer 15 are within a range of temperatures higher than the softening point of the resin and lower than the temperature where the resin is oxidized, and the softening points of the resins are measured by the method according to JIS K6760 (Vicat softening point test for thermoplastic resins).

Figure 3:
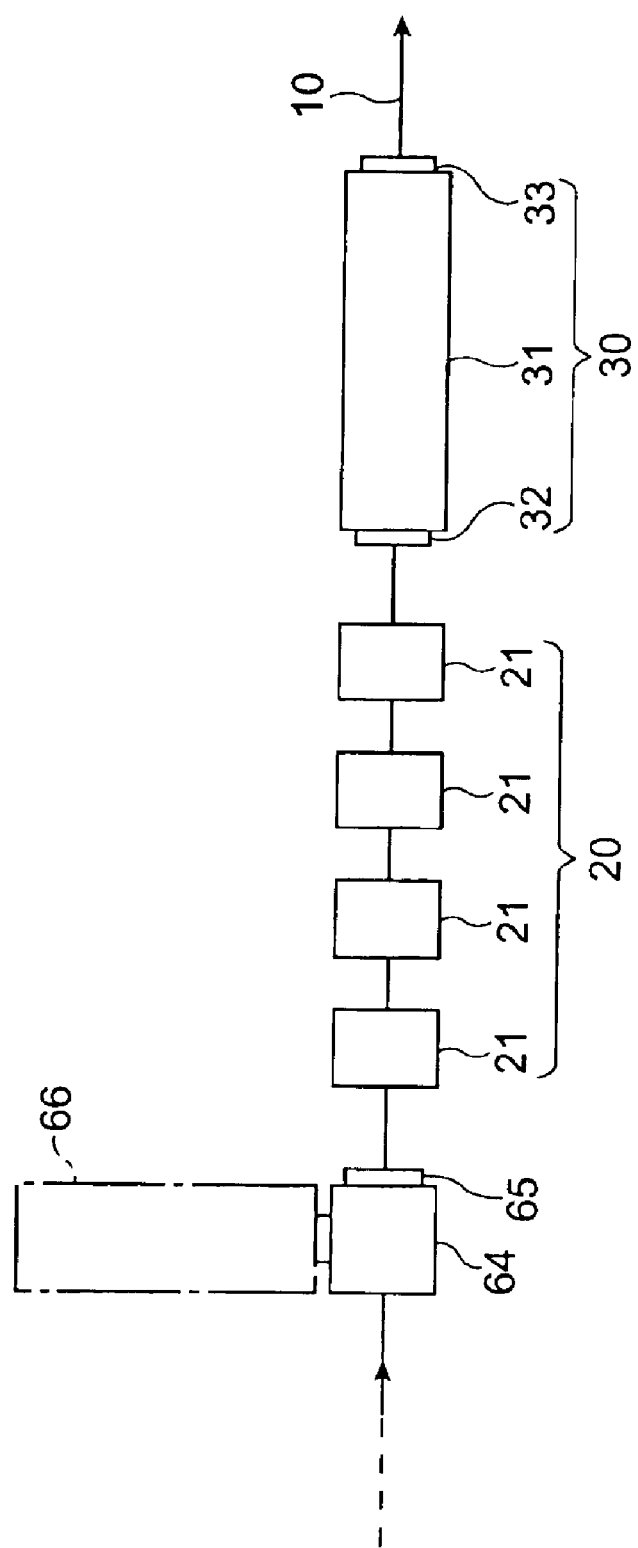
FIG. 3 is a schematic view showing an embodiment of a cooling device suitably applicable to the production methods of the synthetic resin rod according to the present invention.

FIG. 3 is a drawing showing a configuration of a cooling device in which air spray devices 21 are used as the pre-cooling means 20 and a water tank 31 as the main cooling means 30, and the extruder 66 shown in FIG. 1 is placed upstream (on the left side in the figure).

The main cooling means 30 is constructed of the water tank 31 of a trench type opening up, and spongy packings (with such a clearance as not to contact the rod 10) 32, 33 attached to the two end faces of the water tank 31, the interior of the water tank 31 is filled with cooling water, and the synthetic resin rod 10 is introduced into the tank with the cooling water overflowing. A preferred temperature range of the cooling water is 20° C. to 30° C. When the temperature of the cooling water exceeds 30° C., the cooling effect tends to become weaker. When it is lower than 20° C., there arises an unpreferable tendency of increasing cost.

Figure 4:
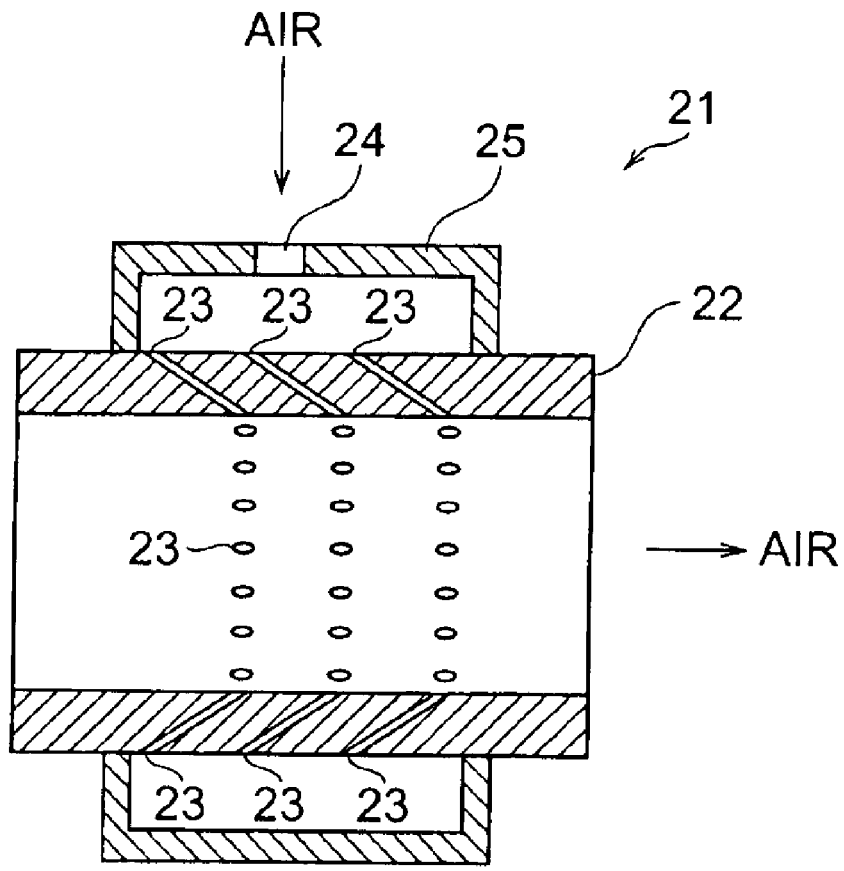
FIG. 4 is a cross-sectional view showing an embodiment of an air spray device suitably applicable to the production methods of the synthetic resin rod according to the present invention.

The air spray device 21 is composed of a cylinder 22 for letting the synthetic resin rod 10 pass therein and a sheath 25 attached with a clearance, in a ring shape, and in a hermetically sealing condition to the outer periphery of the cylinder 22, as shown in FIG. 4, the sheath 25 is provided with a hole 24 through which air is introduced, and a number of spray openings 23 are bored from the outer periphery of the cylinder 22 toward the moving direction of the synthetic resin rod 10.

In the above-stated production system, the synthetic resin rod 10 extruded from the rotary die 65 sequentially passes the plurality of air spray devices 21, as shown in FIG. 3, to be gradually cooled by air blasts. The air blasts from the air spray device 21 shown in FIG. 4 are directed from the circumference of the cylinder 22 toward the center and toward the moving direction of the rod 10, so as to be able to cool the rod evenly. Since the cooling with air involves no application of such water pressure as in the case of cooling with water, the cooling causes no deformation, and thus the as-extruded shape can be maintained accurately. A preferred range of temperatures of the air blasts from the air spray devices 21 is 20° C. to 30° C. When the air temperature exceeds 30° C., the cooling effect tends to become weaker. When it is below 20° C., there arises an unpreferable tendency of increasing cost. The air spray amount (wind speed) is in a preferred range of 25 m/sec to 50 m/sec. If the wind speed is too high, the extruded rod 10 tends to deform. On the other hand, when it is too low, the cooling effect tends to become weaker. Further, a spraying angle of the air with respect to the rod 10 (an angle between the center axis of each air stream sprayed and the center axis of the rod 10) is preferably in the range of 5° to 45°. When this angle exceeds the maximum, the pressure of the air tends to deform the rod readily. On the other hand, when it is below the minimum, the cooling effect tends to become weaker.

On the other hand, since the water cooling has higher cooling efficiency than the air cooling, it is preferable to switch from the air cooling to the water cooling at an earliest possible time in order to shorten the total cooling interval. The inventors noted this point and conducted extensive and intensive research, which led to finding of a method in which the rod was cooled with air until the temperature of the extruded synthetic resin rod 10 reached a temperature not more than the softening point of the synthetic resin making the synthetic resin rod +5° C. (more preferably, a temperature not more than the softening point of the synthetic resin and not less than the softening point −35° C.) and in which thereafter the rod was cooled with water. Namely, air is first sprayed on the synthetic resin rod 10 to cool it without deformation down to the temperature not more than the softening point +5° C. (more preferably, the temperature not more than the softening point). Since the surface has started hardening by the cooling heretofore, the rod is prevented from suffering the change of shape even with variation in the first water-cooled position due to water leakage from the water tank, and from suffering the surface roughness or stripe pattern due to water droplets dropping in part.

(Embodiment 2)

Figure 5:
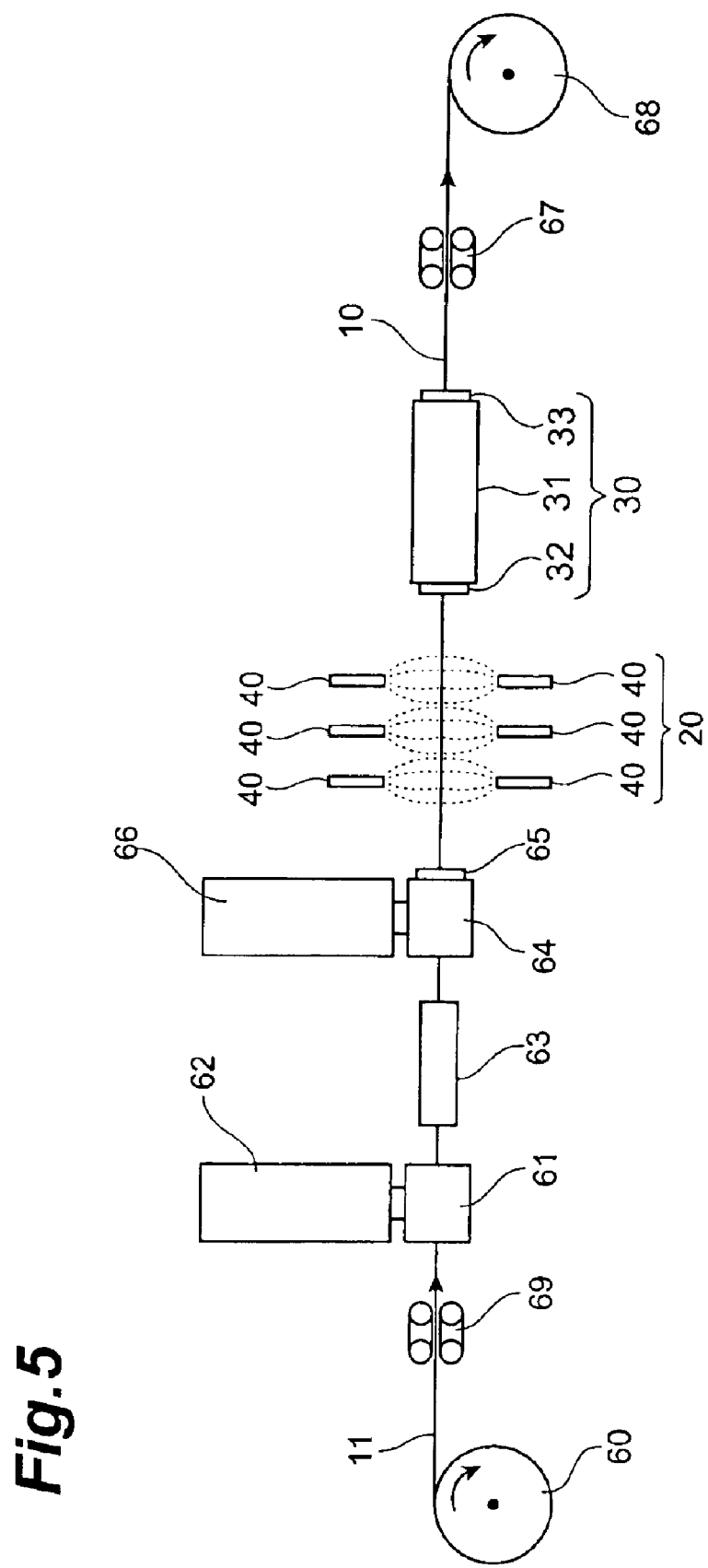
FIG. 5 is a schematic view showing another embodiment of a system suitably applicable to the production methods of the synthetic resin rod according to the present invention.

FIG. 5 is a schematic overall view showing a system for production of the synthetic resin rod according to Embodiment 2. In FIG. 5, the tension-resistive wire 11 fed out of the wire feeder 60 is guided via the brake capstan 69, through the first crosshead 61 of the first extruder 62, and through the first water tank 63 disposed in the extruding direction of the first crosshead 61 to be provided with the first coating layer 12 of the adhesive resin around the tension-resistive wire 11, and subsequently, the tension-resistive wire 11 provided with the first coating layer 12 is guided through the second crosshead 64 of the second extruder 66 having the rotary die 65 to extrude the spacer 15 having the grooves 14, thus forming the synthetic resin rod 10 (extruding step). Then the extruded rod 10 is guided through mist spray devices 40 as the pre-cooling means (second cooling means) 20 and through the cooling device provided with the water tank 31 as the main cooling means (first cooling means) 30, so as to cool and solidify the spacer 15 (cooling step), and the synthetic resin rod 10 thus cooled and solidified is drawn by the drawing device 67 to be wound up by the take-up device 68.

The structure of the main cooling means 30 and the temperature of the cooling water are the same as those described in Embodiment 1.

Figure 6:
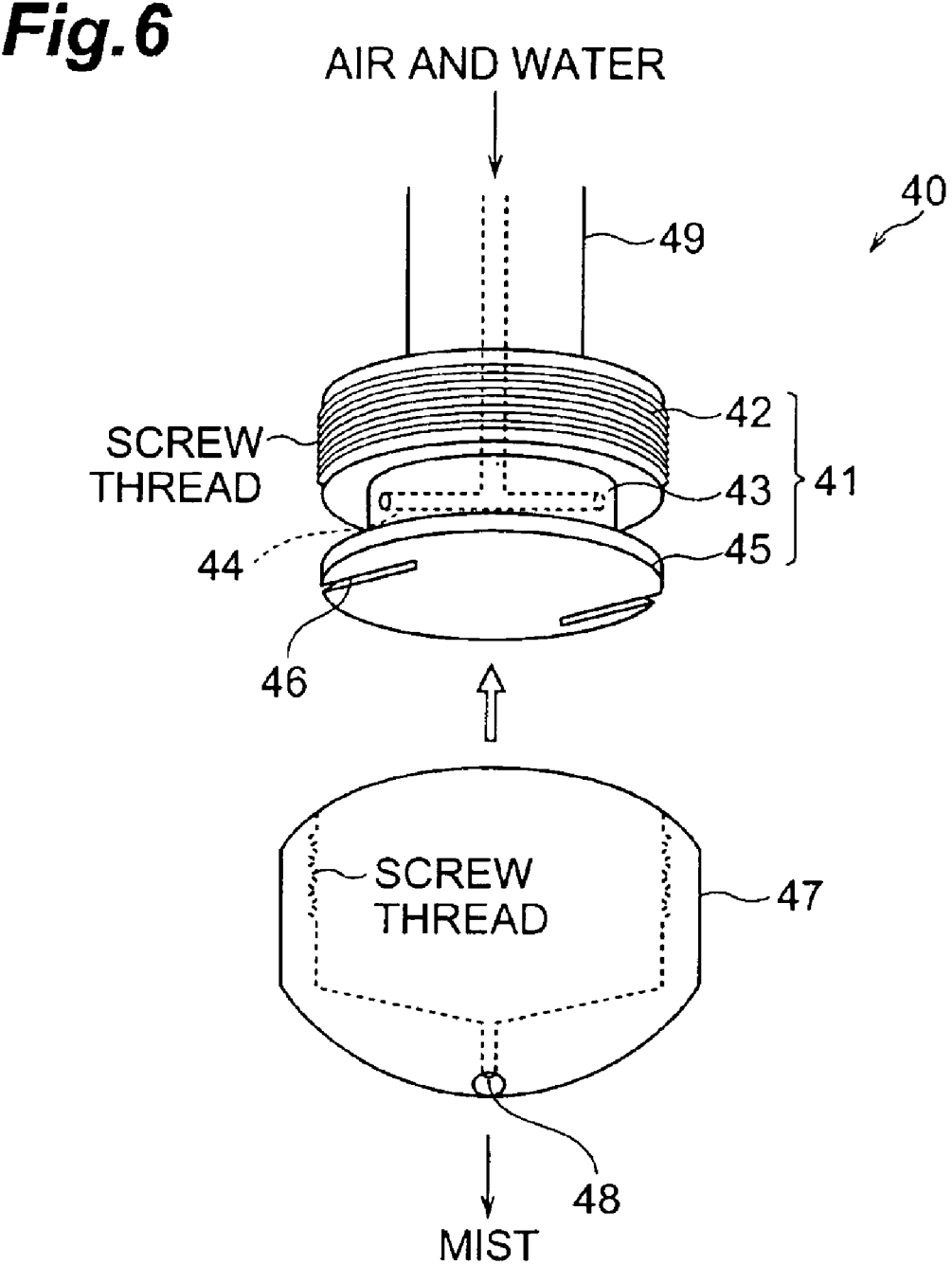
FIG. 6 is an exploded perspective view showing an embodiment of a mist spray device suitably applicable to the production methods of the synthetic resin rod according to the present invention.

In each mist spray device 40, as shown in FIG. 6, a nozzle 41 is constructed by coaxially integrating a thick cylinder 42 having a screw thread in the outer periphery, a small-diameter disk 43 having a through hole 44 passing the center from one point on the circumference and having an outside diameter smaller than that of the thick cylinder 42, and a large-diameter disk 45 having slits 46 extending from the circumference toward the inside and having an outside diameter larger than that of the small-diameter disk 43. A pipe 49 is connected to the thick cylinder 42 of the nozzle 41 and a cap 47 having a spray outlet 48 at the tip is screwed on the side of the large-diameter disk 45 of the nozzle 41.

Water is forced into the nozzle together with air from one end of the pipe 49 and flows through the hole 44 and slits 46 to be ejected from the spray outlet 48. When the water is sprayed from the outlet 48, it forms misty water droplets. Particle sizes of the misty water droplets vary depending upon the ratio of water and air forced into the pipe 49. The higher the ratio of air, the smaller the particle sizes.

In the above-stated production system, the synthetic resin rod 10 extruded from the rotary die 65 successively passes the plurality of mist spray devices 40, as shown in FIG. 5, to be gradually cooled by the misty water droplets thus sprayed. Since the mist cooling involves no application of water pressure on the synthetic resin rod 10, different from the water cooling, the cooling causes no deformation and the as-extruded shape is maintained as it is.

On the other hand, since the water cooling has higher cooling efficiency than the mist cooling, it is preferable to switch from the mist cooling to the water cooling at an earliest possible time in order to shorten the total cooling interval. The inventors noted this point and conducted intensive and extensive research, which led to finding of a method in which the synthetic resin rod 10 extruded was cooled by the mist cooling until the rod 10 reached a temperature not more than the softening point of the synthetic resin making the synthetic resin rod +5° C. (more preferably, a temperature not more than the softening point of the synthetic resin and not less than the softening point −35° C.) and in which thereafter the rod was cooled by the water cooling. Namely, the misty water droplets are first sprayed on the synthetic resin rod 10 to cool the resin down to the temperature not more than the softening point +5° C. (more preferably, the temperature not more than the softening point) without deformation thereof. Since the surface has started hardening by the cooling heretofore, the resin is prevented from suffering the surface change even with variation in the first water-cooled position due to the water leakage from the water tank, and from suffering the surface roughness or stripe pattern due to water droplets dropping in part.

In order to carry out the mist cooling efficiently, a mean particle size of the misty water droplets is an important matter. Too small mean particle sizes tend to lower the cooling efficiency and too large mean particle sizes tend to cause surface roughness upon deposition of particles on the surface of the extruded synthetic resin rod. According to the inventors' research results, the mean particle size of the misty water droplets is preferably in the range of 20 $\mu$m to 80 $\mu$m. When the mean particle size is less than 20 $\mu$m, the cooling effect tends to become weaker. On the other hand, when the mean particle size is over 80 $\mu$m, the water droplets tend to cause the surface roughness of the synthetic resin rod readily. A preferred temperature range of the misty water droplets is 20° C. to 30° C. When the misty water droplets become higher than 30° C., the cooling effect tends to become weaker. When they are below 20° C., the cost becomes higher, unpreferably.

(Embodiment 3)

Figure 7:
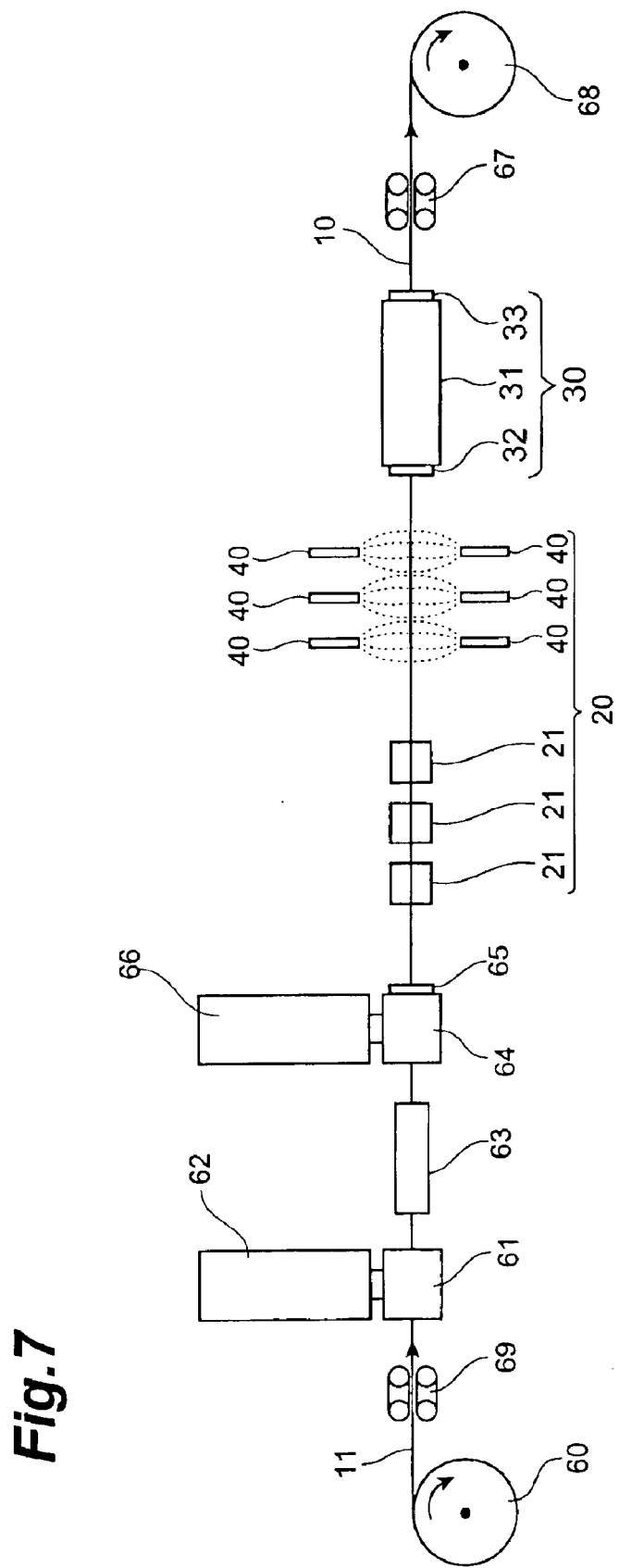
FIG. 7 is a schematic view showing still another embodiment of a system suitably applicable to the production methods of the synthetic resin rod according to the present invention.

FIG. 7 is a schematic overall view showing a system for production of the synthetic resin rod according to Embodiment 3. In FIG. 7, the tension-resistive wire 11 fed out of the wire feeder 60 is guided via the brake capstan 69, through the first crosshead 61 of the first extruder 62, and through the first water tank 63 disposed in the extruding direction of the first crosshead 61 to be provided with the first coating layer 12 of the adhesive resin around the tension-resistive wire 11, and subsequently, the tension-resistive wire 11 provided with the first coating layer 12 is guided through the second crosshead 64 of the second extruder 66 having the rotary die 65 to extrude the spacer 15 having the helical or SZ grooves 14, thus forming the synthetic resin rod 10 (extruding step). Then the extruded rod 10 is guided through air spray devices 21 and mist spray devices 40 as the pre-cooling means (second cooling means) 20 and through the cooling device provided with the water tank 31 as the main cooling means (first cooling means) 30, so as to cool and solidify the spacer 15 (cooling step), and the synthetic resin rod 10 thus cooled and solidified is drawn by the drawing device 67 to be wound up by the take-up device 68.

The structure of the main cooling means 30 and the temperature of the cooling water, and the structure of the air spray devices 21 as one pre-cooling means 20 and the temperature of the air are the same as those described in Embodiment 1. The structure of the mist spray devices 40 as the other pre-cooling means 20 and the mean particle size and temperature of the misty water droplets are the same as those described in Embodiment 2.

In the above-stated production system, the synthetic resin rod 10 extruded from the rotary die 45 of the second crosshead 64 successively passes the plurality of air spray devices 21 and the plurality of mist spray devices 40, as shown in FIG. 7, to be gradually cooled by the air and misty water droplets sprayed. Execution of the air and mist coolings prior to the water cooling is preferable from the viewpoint of maintaining the dimensional accuracy, because no water pressure is exerted on the synthetic resin rod 10 extruded.

Further, in the case wherein the extruded rod 10 has the SZ grooves with the ribs 13 regularly reversing their turning directions, molding strain remaining inside the ribs 13 produces forces drawing the ribs inwardly of curves of the ribs near the reversing points, so that the grooves become easier to deform. If the water stream or water droplets, which are apt to vary the first contact position with the cooling water, were applied to such a rod 10 immediately after the extrusion, great local deformation could occur. In the present embodiment, therefore, the surface temperature of the ribs is first lowered to a temperature near the softening point (preferably, the softening point ±20° C.) by the air cooling and then the rod is guided into the mist cooling devices. The surfaces of the ribs are further cooled to a lower temperature (preferably, a temperature not more than the softening point and not less than the softening point −35° C.) by the mist cooling and thereafter are completely cooled by the water cooling. First executing the air cooling is preferable in terms of maintaining the dimensional accuracy, because it exerts a smaller external force on the ribs than the mist cooling.

(Embodiment 4)

Figure 8:
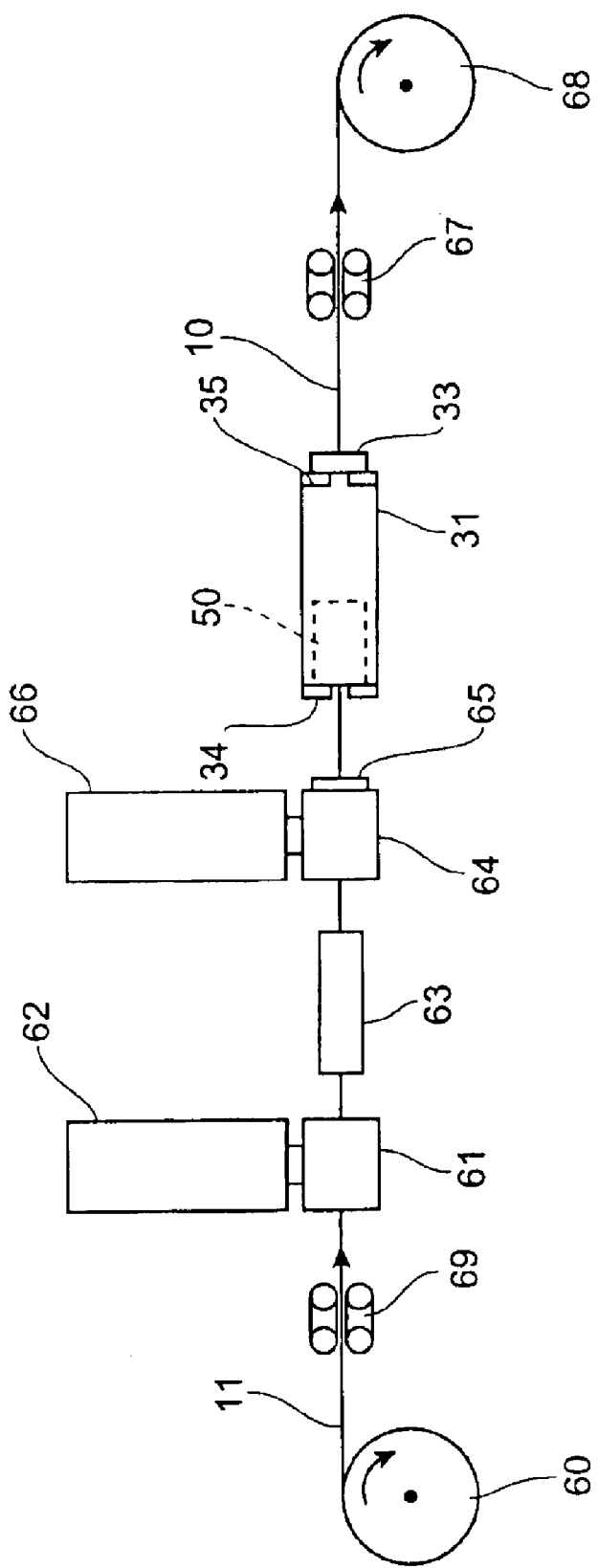
FIG. 8 is a schematic view showing still another embodiment of a system suitably applicable to the production methods of the synthetic resin rod according to the present invention.
Figure 9A:
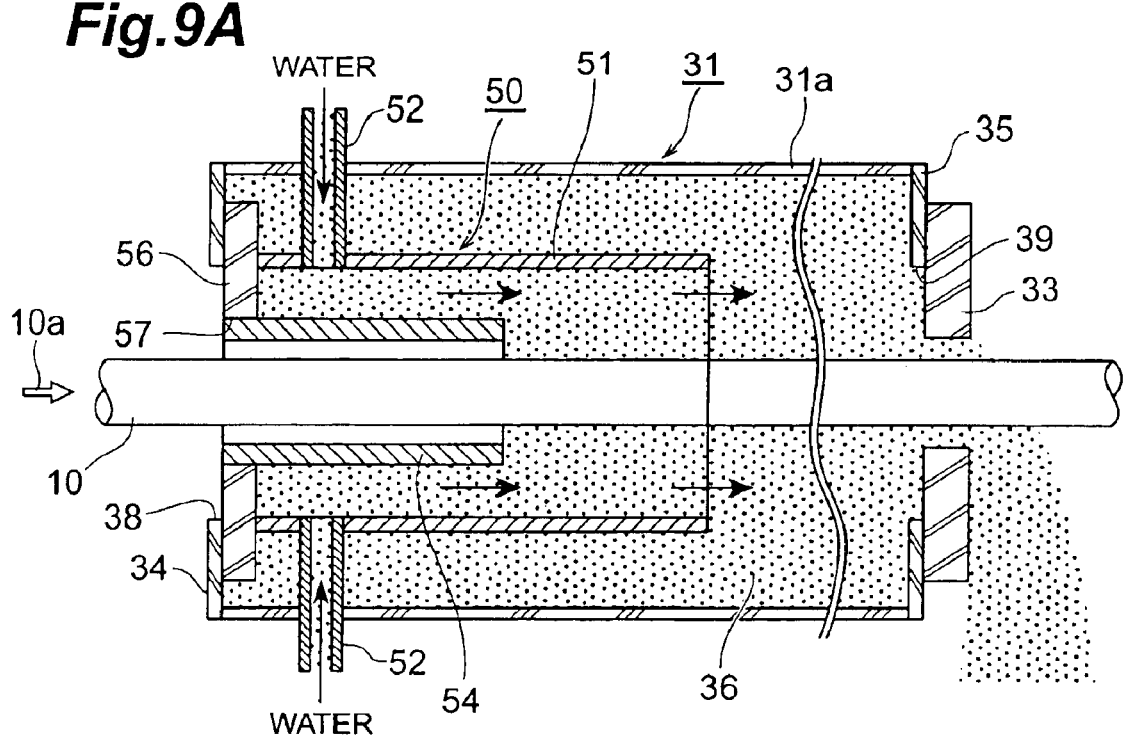
FIG. 9A is a cross-sectional side view showing an embodiment of a water tank having a leak preventing device suitably applicable to the production methods of the synthetic resin rod according to the present invention, and FIG. 9B a front view of the leak preventing device.
Figure 9B:
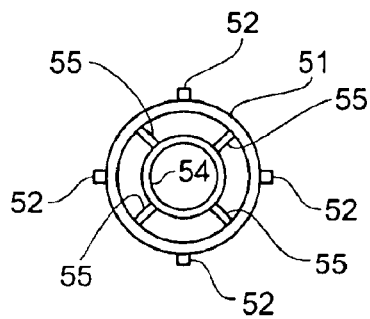

FIG. 8 is a schematic overall view showing a system for production of the synthetic resin rod according to Embodiment 4, FIG. 9A a cross-sectional view showing the structure of the water tank equipped with the leak preventing device used in this production system, and FIG. 9B a front view of the leak preventing device. In FIG. 8, the tension-resistive wire 11 fed out of the wire feeder 60 is guided via the brake capstan 69, through the first crosshead 61 of the first extruder 62, and through the first water tank 63 disposed in the extruding direction of the first crosshead 61 to be provided with the first coating layer 12 of the adhesive resin around the tension-resistive wire 11. Subsequently, the tension-resistive wire 11 provided with the first coating layer 12 is guided through the second crosshead 64 of the second extruder 66 having the rotary die 65 to extrude the spacer 15 having the grooves 14, thus forming the synthetic resin rod 10 (extruding step). Then the synthetic resin rod 10 thus extruded is guided through the water tank 31 equipped with the leak preventing device 50 on the rod entrance side, so as to cool and solidify the spacer 15 (cooling step), and the synthetic resin rod 10 thus cooled and solidified is drawn by the drawing device 67 to be wound up by the take-up device 68.

The cooling means in the present embodiment, as shown in FIG. 9A, is provided with the water tank 31 having a water tank body 31a of a cylindrical type or a trench type opening up, a first lid member (first end face member) 34 provided with a rod entrance (wire entrance) (a clearance for letting the rod 10 pass) 38 and attached to one end portion of the water tank body 31a, and a second lid member (second end face member) 35 provided with a rod exit (wire exit) (a clearance for letting the rod 10 pass) 39 and attached to the other end portion of the water tank body 31a. The leak preventing device 50 is attached to the first lid member 34 provided with the rod entrance 38. Cooling water 36 is introduced into the water tank 31 and a spongy packing (placed with such a clearance as not to contact the rod 10) 33 is attached to the end face 35 of the first rid member 34 provided with the rod exit 39. The temperature range of the cooling water 36 is the same as that described in Embodiment 1.

The leak preventing device 50, as shown in FIG. 9A and FIG. 9B, is comprised of an outer cylinder 51 having a diameter smaller than that of the water tank body 31a, having a plurality of water inlets 52 in its cylindrical wall (side wall), and arranged coaxially in the water tank body 31a; an inner cylinder 54 being shorter than the outer cylinder 51, having a diameter smaller than that of the outer cylinder 51, and arranged coaxially in the outer cylinder 51; and a sealing member (disk) 56 for sealing the portion outside the inner cylinder 54 in the rod entrance 38. Such a sealing member 56 is attached to one-side ends of the outer cylinder 51 and the inner cylinder 54, a hole 57 having the diameter substantially equal to that of the inner cylinder 54 is bored in the center, and the outer edge portion thereof is attached to the first lid member 34 provided with the rod entrance 38. The concentric space between the outer cylinder 51 and the inner cylinder 54 is divided by partitions 55 and there is one inlet 52 provided for each of divided space regions. Water supplied from each inlet 52 flows through the space surrounded by the outer cylinder 51, the inner cylinder 54, and the partitions 55 to be forced in the moving direction of the rod 10 (as indicated by an arrow 10a in FIG. 9A), and eventually merges with the cooling water 36 in the water tank 31. Accordingly, vertical or lateral flow speeds can be adjusted by changing flow rates of water supplied through the respective inlets 52.

With use of the above leak preventing device 50, when the synthetic resin rod 10 passes in the inner cylinder 54 to enter the interior of the water tank 31, the leak preventing device 50 forcibly generates water streams in the moving direction 10a of the rod 10. Further, as the rod 10 having passed the inner cylinder 54 moves in the water tank 31, a water stream is generated in the moving direction 10a of the rod 10 because of the viscosity of water. This running water generated in the moving direction 10a of the rod 10 acts to prevent the leakage of water apt to flow backward in the clearance between the inside cylinder 54 and the rod 10. Then the leakage of water from the rod entrance 38 is prevented more accurately by controlling the amounts of water supplied through the inlets 52 of the leak preventing device 50, so as to fix the first contact position of the synthetic resin rod 10 with the cooling water 36, whereby the synthetic resin rod 10 is cooled stably without a speed difference of cooling thereof.

A preferred range of the clearance between the internal surface of the inner cylinder 54 and the external surface of the rod 10 herein is 1.0 mm to 3.0 mm. When the clearance exceeds 3.0 mm, the prevention of water leakage tends to become harder. When the clearance is below 1.0 mm on the other hand, the inner cylinder tends to contact the synthetic resin rod readily.

The preferred embodiments of the present invention were described above, but it is noted that the methods of the present invention are not limited to the above embodiments. Specifically, although the production systems shown in FIG. 1, FIG. 5, and FIG. 7 according to the above embodiments are constructed without use of the leak preventing device 50 shown in FIG. 9, the water tank 31 in the production systems shown in these figures may be replaced by the water tank 31 equipped with the leak preventing device 50.

In the leak preventing device 50 shown in FIG. 9, the first lid member 34 and the sealing means 56 are constructed of their respective, separate members, but they may be integrally formed of a single member.

EXAMPLES

Examples 1 to 6, Reference Example 1, and Comparative Examples 1 and 2

Based on the above embodiments, the inventors produced the synthetic resin rods in the spacer structure shown in FIG. 2 with the helical grooves turning in one direction, using the production systems shown in FIG. 1, FIG. 5, FIG. 7, and FIG. 8. The production conditions and results obtained (the surface condition and dimensional accuracy of the rods) are presented in Table 1.

The surface condition of the rods was evaluated according to the following criteria: A. good for smooth groove surfaces of the spacer; B. reasonably good for surfaces with some surface roughness or stripe pattern; C. no good for surfaces with projections and depressions.

The dimensional accuracy of the rods was evaluated according to the following criteria: A. good where errors relative to the groove width of 1.5 mm were less than ±0.1 mm; B. reasonably good where the errors were between ±0.1 mm inclusive and ±0.2 mm; C. no good where the errors were not less than ±0.2 mm.

the crosshead 64 attached to the extruder 66 and was coated by extruding the spacer 15 of high density polyethylene having the Vicat softening point of 122° C. in the cross-sectional shape shown in FIG. 2, at 180° C. through the rotary die 65, thus producing the synthetic resin rod 10. The pitch of the helical grooves of the spacer 15 was 400 mm, the width of the grooves 1.5 mm, and the outside diameter 8.5 mm. The adhesive resin herein was a material to enhance the adhesiveness between the two materials in coating of polyethylene or the like over the tension-resistive wire 11 of steel or the like, which was the resin containing a polar component with high adhesiveness to the tension-resistive wire 11 and a polyolefin component with high adhesiveness to polyethylene.

TABLE 1

| | | COOLING MEANS | | | | | | | | |
|---|---|---|---|---|---|---|---|---|---|---|
| | | AIR COOLING | | MIST COOLING | | | WATER COOLING | | | |
| | LINEAR SPEED OF PRODUCTION (m/min) | LENGTH (m) | TEMPERATURE IMMEDIATELY AFTER AIR COOLING (° C.) | LENGTH (m) | MEAN PARTICLE SIZE (μm) | TEMPERATURE IMMEDIATELY AFTER MIST COOLING (° C.) | LENGTH (m) | LEAK PREVENTING DEVICE | TEMPERATURE IMMEDIATELY AFTER WATER COOLING (° C.) | SURFACE CONDITION | DIMENSIONAL ACCURACY |
| EXAMPLE 1 | 10 | 3 | 119 | — | — | — | 3 | — | 22 | A | A |
| EXAMPLE 2 | 10 | 4.8 | 105 | — | — | — | 3 | — | 22 | A | A |
| COMPARATIVE EXAMPLE 1 | 10 | 2.5 | 130 | — | — | — | 3 | — | 23 | C | C |
| EXAMPLE 3 | 10 | — | — | 2 | 20 | 105 | 3 | — | 22 | A | A |
| EXAMPLE 4 | 15 | — | — | 2 | 40 | 119 | 3 | — | 22 | A | A |
| EXAMPLE 5 | 15 | — | — | 2 | 80 | 105 | 3 | — | 22 | A | A |
| REFERENCE EXAMPLE 1 | 10 | — | — | 2 | 90 | 90 | 3 | — | 22 | B | B |
| EXAMPLE 6 | 15 | — | — | — | — | — | 3 | USED | 23 | A | A |
| COMPARATIVE EXAMPLE 2 | 15 | — | — | — | — | — | 3 | — | 23 | C | C |

Example 1

In the production system of the synthetic resin rod shown in FIG. 1, the air spray devices 21 shown in FIG. 4 were arranged as the pre-cooling means 20 at intervals of 50 cm across 3 m in the moving direction of the rod 10 and the cooling device consisting of the water tank 31 with the packings 32, 33 at the both ends thereof was used as the main cooling means 30. The temperature of the air blasts from the air spray devices 21 was 20° C., the air spray rate (wind speed) was 40 m/sec, and the length of the water tank filled with the cooling water at the water temperature of 22° C. was 3 m.

A steel wire having the outside diameter of 2.6 mm was guided through the crosshead 61 attached to the extruder 62, to coat the outside periphery thereof with the adhesive resin in the outside diameter of 3 mm. Then it was guided through When the rod 10 was produced at the linear speed (production speed or line speed) of 10 m/min, the surface temperature of the spacer 15 immediately after the air cooling was 119° C. and the surface temperature immediately after the water cooling 22° C. The spacer 15 produced had the helical grooves 14 whose errors were within the range of ±0.1 mm relative to the groove width of 1.5 mm and a good rod was obtained in the surface condition without the surface roughness or the like.

Example 2

The spacer was produced in the same manner as in Example 1 except that the length for the air cooling was extended from 3 m to 4.8 m. The surface temperature immediately after the air cooling was 105° C. and the surface temperature immediately after the water cooling 22° C. The spacer produced had the helical grooves whose errors were within the range of ±0.1 mm relative to the groove width of 1.5 mm and a good rod was obtained in the surface condition without the surface roughness or the like.

Comparative Example 1

The spacer was produced in the same manner as in Example 1 except that the length for the air cooling was reduced from 3 m to 2.5 m. The surface temperature immediately after the air cooling was 130° C. and the surface temperature immediately after the water cooling 23° C. The spacer 15 produced had portions where the groove width of the helical grooves 14 was not more than 1.3 mm and the surface condition was such that there appeared depressions and projections due to droplets of water upon entry of the rod into the water tank.

Example 3

In the production system of the synthetic resin rod shown in FIG. 5, the mist spray devices 40 shown in FIG. 6 were arranged as the pre-cooling means 20 at intervals of 50 cm across 2 m in the moving direction of the rod 10 and the cooling device consisting of the water tank 31 with the packings 32, 33 at the both ends thereof was used as the main cooling means 30. The temperature of the misty water droplets sprayed from the mist spray devices 40 was 22° C., the mean particle size was 20 $\mu$m, and the length of the water tank 31 filled with the cooling water at the water temperature of 22° C. was 3 m.

A steel wire having the outside diameter of 2.6 mm was guided through the crosshead 61 attached to the extruder 62 to coat the outside periphery thereof with the adhesive resin in the outside diameter of 3 mm. Then it was guided through the crosshead 64 attached to the extruder 66 and was coated by extruding the spacer 15 of high density polyethylene having the Vicat softening point of 122° C. in the cross-sectional shape shown in FIG. 2, at 180° C. through the rotary die 65, thus producing the synthetic resin rod 10. The pitch of the helical grooves of the spacers 15 was 400 mm, the width of the grooves 1.5 mm, and the outside diameter 8.5 mm.

When the synthetic resin rod 10 was produced at the linear speed of 10 m/min, the surface temperature immediately after the mist cooling was 105° C., and the surface temperature immediately after the water cooling 22° C. The helical grooves 14 produced were within the range of ±0.1 mm relative to the groove width of 1.5 mm and a good rod was obtained in the surface condition without the surface roughness or the like.

Example 4

The spacer was produced in the same manner as Example 3 except that the linear speed of production (production speed or line speed) was increased from 10 m/min to 15 m/min and the mean particle size of mist was increased from 20 $\mu$m to 40 $\mu$m. The surface temperature immediately after the mist cooling was 119° C. and the surface temperature immediately after the water cooling 22° C. The spacer 15 produced had the helical grooves whose errors were within the range of ±0.1 mm relative to the groove width of 1.5 mm and a good rod was obtained in the surface condition without the surface roughness or the like.

Example 5

The spacer was produced in the same manner as in Example 3 except that the linear speed of production was increased from 10 m/min to 15 m/min and the mean particle size of mist was increased from 20 $\mu$m to 80 $\mu$m. The surface temperature immediately after the mist cooling was 105° C. and the surface temperature immediately after the water cooling 22° C. The spacer produced had the helical grooves 14 whose errors were within the range of ±0.1 mm relative to the groove width of 1.5 mm and a good rod was obtained in the surface condition without the surface roughness or the like.

Reference Example 1

The spacer was produced in the same manner as in Example 3 except that the mean particle size of mist was increased from 20 $\mu$m to 100 $\mu$m. The surface temperature immediately after the mist cooling was 90° C. and the surface temperature immediately after the water cooling 22° C. The spacer 15 produced had portions of the helical grooves 14 whose errors were between ±0.1 mm inclusive and ±0.2 mm relative to the groove width of 1.5 mm and there appeared some surface roughness due to spraying of mist particles on the surface of the helical grooves 14. Water droplets were observed on the surface of the spacer when the particle sizes of sprayed water particles were increased and there sometimes occurred a phenomenon in which the water droplets moved under force of wind during the spray. The inventors realize that this phenomenon is the cause of the imperfection of the shape such as the groove width.

Example 6

Used in the production system of the synthetic resin rod shown in FIG. 8 was the cooling device having the water tank 31 in which the leak preventing device 50 in the structure shown in FIG. 8 was attached to the first lid member 34 provided with the rod entrance 38 and in which the packing 33 was attached to the second lid member 35 provided with the rod exit 39. The length of the water tank 31 filled with the cooling water at the water temperature of 22° C. was 3 m, the width of the trench 150 mm, and the diameter of the rod entrance 38 was 80 mm. The length of the outer cylinder 51 making up the leak preventing device 50 was 100 mm, the outside diameter thereof 80 mm, and the inside diameter thereof 76 mm; the length of the inner cylinder 54 was 50 mm, the outside diameter thereof 16 mm, and the inside diameter thereof 12 mm. Further, the temperature of the cooling water introduced through each inlet 52 was 22° C.

A steel wire having the outside diameter of 2.6 mm was guided through the crosshead 61 attached to the extruder 62 and the periphery thereof was coated with the adhesive resin in the outside diameter of 3 mm. Then this was guided through the crosshead 64 attached to the extruder 66 and the spacer 15 of high density polyethylene having the Vicat softening point of 122° C. was extruded at 180° C. in the cross-sectional shape shown in FIG. 2, through the rotary die 65 to coat the adhesive resin, thereby producing the synthetic resin rod. The pitch of the helical grooves of the spacer 15 was 400 mm, the width of the grooves 1.5 mm, and the outside diameter thereof 8.5 mm.

When the synthetic resin rod 10 was produced at the linear speed of 15 m/min, the surface temperature immediately after the water cooling was 23° C. The spacer 15 produced had the helical grooves 14 whose errors were within the range of ±0.1 mm relative to the groove width of 1.5 mm and a good rod was obtained in the surface condition without the surface roughness or the like.

Comparative Example 2

The spacer was produced in the same manner as in Example 6 except that the water tank 31 used herein was the one in which, instead of the leak preventing device 50, the packing 32 (made of sponge 10 mm thick and having the clearance for passage of the rod in the diameter of 9 mm) was attached to the first lid member 34 provided with the rod entrance 38. The surface temperature immediately after the water cooling was 23° C. The spacer 15 produced had portions of the helical grooves 14 where the groove width was not more than 1.3 mm and the surface condition was such that there appeared depressions and projections due to droplets of water upon entry of the rod into the water tank.

Example 7 and Reference Example 2

Figure 10:
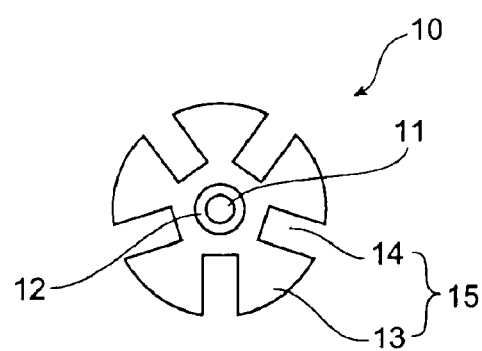
FIG. 10 is a cross-sectional view showing a synthetic resin rod having a spacer which has SZ grooves on the outer surface.

Then the inventors produced the synthetic resin rod in the spacer structure (of SZ grooves) in which the grooves formed in the surface regularly varied their turning directions, using the production system shown in FIG. 7. FIG. 10 is a view showing a cross section of this synthetic resin rod, wherein the synthetic resin rod 10 is provided with the primary coating layer 12 of adhesive resin around the periphery of the tension-resistive wire 11 and the outer periphery thereof is coated with the spacer 15 provided with five grooves 14 in the longitudinal direction. The production conditions and results obtained (the surface condition and dimensional accuracy of rods) are presented in Table 2.

The surface condition of the rods was evaluated according to the following criteria: A. good for smooth groove surfaces of the spacer; B. reasonably good for surfaces with some surface roughness or stripe pattern; C. no good for surfaces with projections and depressions.

The dimensional accuracy of the rods was evaluated according to the following criteria: A. good where errors relative to the groove width of 4.4 mm were less than ±0.3 mm; B. reasonably good where the errors were between ±0.3 mm inclusive and ±0.6 mm; C. no good where the errors were not less than ±0.6 mm.

with the packings 32, 33 at the both ends. The temperature of the air blasts from the air spray devices 21 was 20° C., the air blast amount (wind speed) 40 m/sec, the temperature of the misty water droplets sprayed from the mist spray devices 40 22° C., the mean particle size thereof 20 μm, and the length of the water tank 31 filled with the cooling water at the water temperature of 22° C. 3 m.

A steel wire having the outside diameter of 2.3 mm was guided through the crosshead 61 attached to the extruder 62 and the outer periphery thereof was coated with the adhesive resin in the outside diameter of 3.5 mm. Then this was guided through the crosshead 64 attached to the extruder 66 and the spacer 15 of high density polyethylene having the Vicat softening point of 122° C. was extruded at 180° C. in the cross-sectional shape shown in FIG. 10, through the rotary die 65 reversing its rotating direction every turn of 270° to cover the adhesive resin, thereby producing the synthetic resin rod 10. The spacer 15 had the SZ grooves 14 at the reverse pitch of 150 mm, in the groove width of 4.4 mm, and in the outside diameter of 11.0 mm.

When the rod 10 was produced at the linear speed of 5 m/min, the surface temperature of the spacer 15 immediately after the air cooling was 135° C., the surface temperature of the spacer 15 immediately after the mist cooling 87° C., and the surface temperature immediately after the water cooling 22° C. The spacer 15 produced had the SZ grooves 14 whose errors were within the range of ±0.3 mm relative to the groove width of 4.4 mm and a good rod was obtained in the surface condition without the surface roughness or the like.

Reference Example 2

The spacer 15 shown in FIG. 10 was produced in the same manner as in Example 7 except that the air blasts from the air spray devices 21 were stopped. The surface condition

TABLE 2

| | | COOLING MEANS | | | | | | | | |
|---|---|---|---|---|---|---|---|---|---|---|
| | | AIR COOLING | | MIST COOLING | | | WATER COOLING | | | |
| | LINEAR SPEED OF PRODUCTION (m/min) | LENGTH (m) | TEMPERATURE IMMEDIATELY AFTER AIR COOLING (° C.) | LENGTH (m) | MEAN PARTICLE SIZE (μm) | TEMPERATURE IMMEDIATELY AFTER MIST COOLING (° C.) | LENGTH (m) | LEAK PREVENTING DEVICE | TEMPERATURE IMMEDIATELY AFTER WATER COOLING (° C.) | SURFACE CONDITION | DIMENSIONAL ACCURACY |
| EXAMPLE 7 | 5 | 1 | 135 | 2 | 20 | 87 | 3 | — | 22 | A | A |
| REFERENCE EXAMPLE 2 | 5 | — | — | 2 | 20 | 90 | 3 | — | 22 | A | B |

Example 7

Used in the production system of the synthetic resin rod shown in FIG. 7 was the cooling device in which the pre-cooling means 20 consisted of the air spray devices 21 arranged at intervals of 50 cm across 1 m and the mist spray devices 40 arranged at intervals of 50 cm across 2 m in the moving direction of the rod 10 and in which the main cooling means 30 consisted of the water tank 31 provided was good without appearance of surface roughness or the like, but errors of the SZ grooves 14 were within the range of ±0.3 mm to ±0.6 mm relative to the groove width of 4.4 mm.

Investigation was also conducted for polypropylene and nylon 12 as the resin used for the spacer, and it was verified that in either case the predetermined shape was able to be maintained with high accuracy by first cooling the rod to the temperature not more than the softening point of the resin used for the spacer +5° C. by the air cooling or mist cooling and thereafter cooling it by the water cooling and a spacer with a smooth surface was able to be made.

INDUSTRIAL APPLICABILITY

The production methods according to the present invention are the methods of spraying the misty water droplets or air on the extruded synthetic resin rod to cool the rod down to the temperature not more than the softening point +5° C. and thereafter letting the rod pass through water to cool and solidify the rod. Accordingly, solidification has already started in the surface of the rod at the time of entry of the synthetic resin rod into the water tank, which can prevent occurrence of the surface roughness, or depressions and projections due to the water cooling.

Another production method according to the present invention is the method of cooling the extruded synthetic resin rod by the water tank provided with the leak preventing device at the rod entrance. Since the leak preventing device can keep the time of start of the water cooling approximately constant, it can prevent the deformation due to the speed difference (nonuniformity) of cooling or the like.

Accordingly, the present invention enables the production of a rod (wire), even a synthetic resin rod having grooves on the outer surface such as the helical spacers, with high accuracy and with excellent surface nature under high cooling efficiency.

What is claimed is:

1. A method of producing a spacer rod of an optical fiber, said method comprising:

an extruding step of extruding a polyethylene rod;

a pre-cooling step of applying a cooling medium on said rod to pre-cool said rod extruded down to a temperature (T° C.) satisfying the following condition:

$T \leq \{(a\ softening\ point\ of\ said\ polyethylene)+5\}$ [° C.]; and a main cooling step of letting said rod thus pre-cooled pass through water to cool the rod.

2. The method according to claim 1, wherein said rod extruded is cooled down in said pre-cooling step to a temperature (T° C.) satisfying the following condition:

$\{(the\ softening\ point\ of\ said\ polyethylene)-35\} \leq T \leq \{(the\ softening\ point\ of\ said\ polyethylene)\}$ [° C.].

3. The method according to claim 1, wherein said cooling medium is air and said air is applied to the periphery of said rod in said pre-cooling step.

4. The method according to claim 1, wherein said cooling media are air and misty water droplets, and said pre-cooling step comprises:

a first pre-cooling step of sending said air to the periphery of said rod; and a second pre-cooling step of spraying said misty water droplets on the periphery of said rod.

5. A method of producing a spacer rod of an optical fiber, said method comprising:

an extruding step of extruding a polyethylene rod;

a pre-cooling step of spraying misty water droplets, which have a mean particle size in the range of 20 to 80 $\mu$m, in the periphery of said rod to pre-cool said rod extruded down to a temperature (T° C.) satisfying the following condition:

$T \leq \{(a\ softening\ point\ of\ said\ polyethylene)+5\}$ [° C.]; and a main cooling step of letting said rod thus pre-cooled pass through water to cool the rod.

6. The method according to claim 5, wherein in said pre-cooling step, air is applied to said rod together with said misty water droplets, and said pre-cooling step comprises:

a first pre-cooling step of sending said air to the periphery of said rod; and a second pre-cooling step of spraying said misty water droplets on the periphery of said rod.

* * * * *